Figure 1:
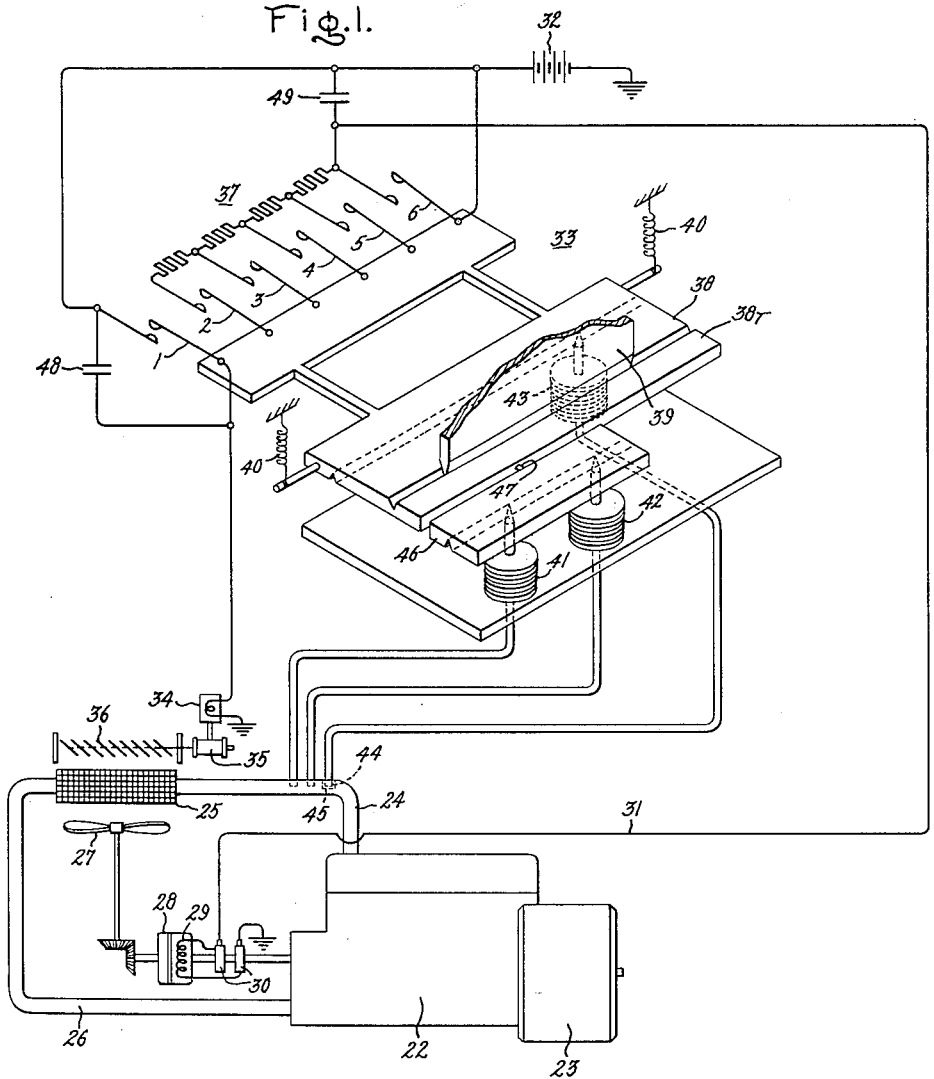

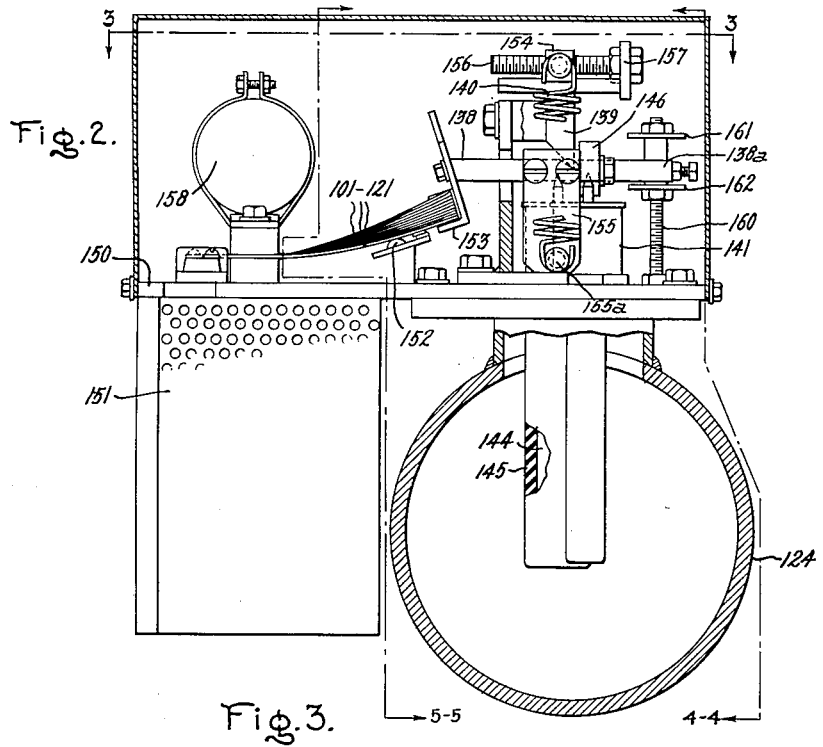

April 1, 1952   E. F. WEISER   2,591,392
TEMPERATURE CONTROL DEVICE
Filed July 22, 1950   3 Sheets-Sheet 3

Inventor:
Earnest F. Weiser,
by Ernest C. Britton
His Attorney.

Patented Apr. 1, 1952

2,591,392

UNITED STATES PATENT OFFICE 2,591,392

TEMPERATURE CONTROL DEVICE

Earnest F. Weiser, Erie, Pa., assignor to General Electric Company, a corporation of New York Application July 22, 1950, Serial No. 175,315

9 Claims. (Cl. 201—48)

My invention relates to a temperature control device and has particular significance in connection with an electric circuit controlling device for use in an electrical system designed to maintain relatively constant temperature as of the cooling fluid of a diesel engine.

It has heretofore been known that engines in general, and particularly diesel engines, operate most efficiently when engine temperature is maintained relatively constant at an optimum temperature level. When such engines are used in traction applications, they must operate through a wide range of ambient temperatures and engine temperature variations are also aggravated by wide variations in load. In Patent 2,505,597 issued April 25, 1950, on an application filed by me, and assigned to the assignee of the present invention, there is described a temperature regulating system for an engine adapted to be cooled by fluid circulating therethrough and through a radiator, the system comprising fan means blowing air over the radiator heat exchanger, temperature responsive means for adjusting the speed of the fan means, and anti-hunt stabilizing means operative after a predetermined period of time to render the temperature responsive means ineffective to further adjust the fan speed without a further change in temperature. In some applications, the system of the above-mentioned patent application has been found somewhat ineffective in meeting the problem of stability at low ambient temperatures and with low heat rejection rates from the engine.

It is an object of the present invention to provide a simple and inexpensive temperature control device for overcoming the above-mentioned difficulties.

It is a further object of the present invention to provide an improved control device providing substantially stabilized automatic temperature regulation at all commonly encountered temperatures and regardless of the heat rejection rate from the engine or other heat source with which it is used.

A still further object of the present invention is to provide a temperature control system which is simpler and consequently less expensive than those heretofore known.

Another object of the invention is to provide an improved electric circuit controlling device for regulating engine cooling temperature and having means for both automatic and manual recalibration.

Broadly, the means employed in the embodiments herein illustrated and described comprises a temperature regulating relay (as for the cooling liquid of a gas engine having a radiator heat exchanger and a slip clutch for varying the speed of a fan blowing air over the radiator) in which a plurality of bellows operating responsive to liquid temperature turn a lever mechanism about a fixed pivot to affect an electrical circuit. The bellows force is opposed by restraining springs and also opposed by an additional bellows having its bulb insulated to some extent but otherwise in the same liquid to provide a delayed and stabilizing counterforce to the same lever mechanism. Means are also employed for varying spring restraint effect both manually and automatically (to compensate for variation of bellows spring action and contact finger forces) and the resultant temperature regulating relay is not only inexpensive to make but extremely accurate over a wide operating range.

Figure 4:
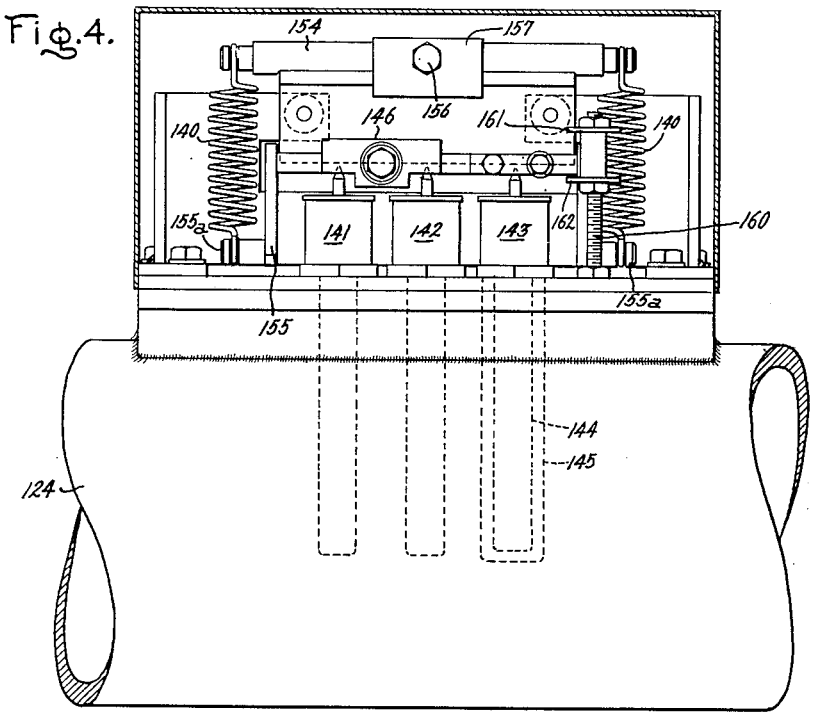
Figure 5:
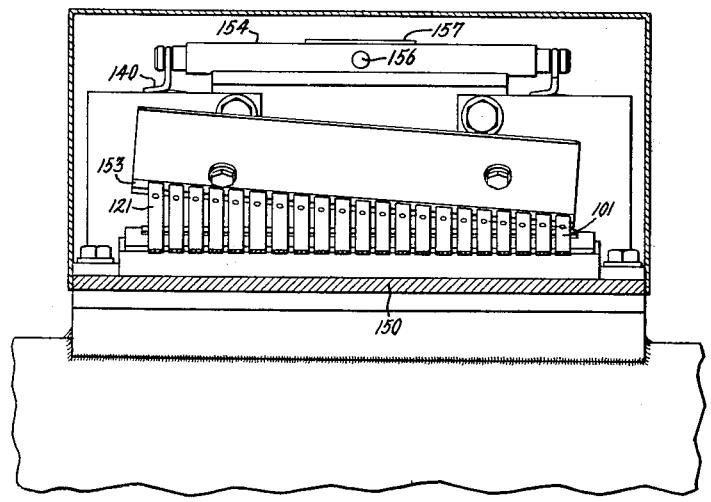

Other objects and advantages will become apparent and my invention will be better understood from consideration of the following description taken in connection with the accompanying drawing in which Fig. 1 is a diagrammatic representation of a complete temperature control system for an internal combustion engine such as a diesel engine as applied in a diesel-electric locomotive power plant; Fig. 2 is an end view of a control device adapted to function as the controlling element for a system such as that illustrated in Fig. 1; Fig. 3 is a plan or top view taken on the line 3—3 of Fig. 2; Fig. 4 is a front elevation taken on the line 4—4 of Fig. 2; and Fig. 5 is a cross sectional longitudinal view taken on the line 5—5 of Fig. 2.

In Fig. 1, I have shown an internal combustion engine 22 connected to drive a main generator 23 for supplying electrical energy to drive a self-propelled diesel-electric vehicle such as a locomotive. The engine 22 is cooled by a fluid medium, such as water, which is circulated from the engine through a conduit 24, through a cooling radiator 25 and back through a conduit 26 to the engine 22. In accordance with conventional practice the radiator 25 is exposed to the outside atmosphere and the required flow of air through the radiator is supplied by a fan 27, which is driven from the main drive shaft of the engine 22 through an electromagnetic or eddy current slip clutch 28 which, as schematically shown, includes an exciting or magnetizing coil 29. Exciting current for the coil 29 is supplied by means of slip rings 30 through a conductor 31 and a ground return circuit. Conductor 31 is energized with respect to ground from a voltage source such as a battery 32 and through the regulating device of the invention indicated generally at 33. The function of the relay device 33 is to sense the temperature in the pipe 24 and at a predetermined "high" temperature energize a magnet valve 34 to, as by means of an air cylinder 35, open shutters 36 covering the radiator, and thereafter at a plurality of higher temperatures increase the excitation of the clutch 28 thereby increasing the fan speed. In the illustrated embodiment this is accomplished by first closing a shutter control contact 1 and then at successive higher temperatures shorting out a resistance bank 37 in five progressive steps by the five sets of contacts numbered 2–6, inclusive, closing (from left to right) as a pivoted contact mounting member 38 (normally biased clockwise by a pair of restraining springs 40) is rotated counterclockwise about a pivot provided by a fixed knife edge 39 when the pivotal member is forced upward at its right end 38r through expansion of a pair of operating bellows 41 and 42 responsive to increased temperature in the pipe 24 in which each bellows has an associated bulb submerged. Bellows 41 and 42 operate together as a team extending upward with an increase in temperature with a force proportional to the temperature. It will be observed that the shutters remain completely open during regulation of fan speed and are closed only when the temperature drops below the point at which clutch excitation is varied.

Stabilization of the device is accomplished by means of a third bellows 43 which operates on arm 38 in a direction to oppose in part the action of bellows 41 and 42. The sensing bulb 44 of bellows 43 is shown thermally insulated from the fluid in conduit 24 by a layer of insulation 45 which causes a time delay between the action of bellows 41 and 42 and that of stabilizing bellows 43. The proper stabilizing action of bellows 43 is accomplished by carefully selecting its effective radius about the pivot point provided by knife edge 39 and the amount of insulation or other thermal characteristic affecting material around its control bulb to provide proper time delay to suit the system constants. My invention is not limited to a case where thermoinsulation is used to produce a time delay in the stabilizer, but obviously includes variations such as where thermostorage is otherwise accomplished as by capacity means achieved by surrounding the bulb with a large mass of heat conducting material.

Two primary control bellows 41 and 42 are used for the control function, as a safety measure against failure of either bellows. By having them operate on an equalizer bar 46 which is secured to the pivotal plate 38 at a pivot point 47 located midway between the points of force application for the two bellows, if one of the bellows should fail, for example bellows 41, and refuse to extend with increase in temperature, this bellows acts as a fixed pivot for the associated end of equalizer bar 46. Such a fixed pivot at one end of the equalizer bar 46 provides the other bellows 42 with a lever ratio of two to one and enables it to operate the system by itself at the same control temperature even though twice the extension over normal is required of it.

Failure of bellows 35 merely reduces the stability and the disappearance of its force on the pivotal arm 38 will result in regulation at a lower temperature but not in complete failure of the system.

If desired, the electrical circuit may be provided with contact shunting capacitors 48 and 49 in order to reduce or eliminate arcing of the contacts as they are opened under load conditions.

Figs. 2–5 illustrate the mechanical arrangement of a relay device which has been actually built, successfully tested, and found to adequately perform the intended functions of the device 21 of Fig. 1. In Figs. 2–5, I have shown the device comprising a base portion 150 mounted more or less directly on a 6 inch water pipe 124 into which the bulbs for the various bellows extend. The resistance bank is not shown but is assumed to be enclosed in the perforated resistance compartment cover 151 which is secured to the base 150 as are a plurality of twenty-one fixed contact members 152. A plurality of movable contact fingers 101—121 each engage a different one of the fixed contacts and, as illustrated, the twenty-one movable contact fingers are adapted to be sequentially raised each of its associated fixed contact by a sloping contact finger operator 153 attached to a pivotal assembly 138 rotatable around a knife edge member 139. The fingers are closed by movement of assembly 138 counterclockwise (as viewed in Fig. 2) about the knife edge pivot by extension of bellows 141 and 142 (see Figs. 3 and 4) operating on pivotal assembly 138 through an equalizing bar 146. Bellows 141 and 142 operate together as a team extending upward with an increase in temperature with a force proportional to that temperature. This movement is restrained by calibrating springs 140 secured at their upper ends to a horizontally sliding member 154 and secured at their lower ends to pins 155a on downwardly extending extensions 155 of the pivotal assembly 138. A desirable feature is introduced by having the operating temperature of the relay adjusted by sliding movement of the otherwise stationary member 154 as by having it threadedly engaged by a bolt 156 so the member 154 will be adjustable back and forth with respect to a stationary end plate 157 by adjustment of the bolt 154. In this manner the effective radius of action of springs 140 with respect to the knife edge pivot 139 may be manually altered, thereby altering their restraint against movement of pivotal assembly 138. To achieve the utmost sensitivity to temperature, it is desirable to compensate for the disappearing finger forces on arm 153 as the fingers close and this is done by reducing the clockwise torque on assembly 138 provided by the springs 140 as the arm moves counterclockwise from the position shown. To this end the spring posts 155a are mounted on the vertical extensions 155 transversely (of the pivotal assembly 138) with respect to the point of attachment (at 154) for the opposite ends of the springs so that the lower end of each spring 140 is moved to the right with counterclockwise movement of assembly 138 thereby reducing the effective radius of action of the springs about the knife edge pivot and accomplishing the reduction of clockwise restraint on assembly 138 as it moves counterclockwise. The arrangement just described can allow compensation for not only finger forces but also for bellows spring rates and the effect of the compensation is to reduce the additional force required of the bellows to accomplish full movement after initial movement of the pivotal assembly 138, thereby reducing the required bellows internal pressure difference and thereby reducing temperature difference required in order for the control bellows to operate with these bellows 141 and 142 nearly fully extended and the fingers almost all closed. This means that the relay can be made to operate accurately near each extreme of a controlled quantity (e. g., clutch excitation), with high or low heat rejection rates and at high or low ambient temperatures.

As with the arrangement of Fig. 1, the relay device illustrated in Figs. 2–5 has stabilization of the device accomplished by means of a third bellows (143 as indicated in Figs. 3 and 4) which operates on the pivotal assembly 138 in a direction to oppose in part the action of the main control bellows. The sensing bulb 144 of bellows 143 is thermally insulated from the cooling medium by a jacket 145 which results in a time delay between the action of bellows 141 and 142 and that of bellows 143. The effect of this time delay is as follows: During a rapid increase of water temperature, bellows 141 and 142 are not opposed as strenuously by bellows 143 as normally (due to the lagging effect of the bulb insulation) and are thereby able to close the contact fingers at an earlier time and consequently at a lower temperature than with a slow rate of water temperature increase. This early increase in result (for example of clutch excitation and fan speed as indicated in Fig. 1) enables the system to check the rapid increase in water temperature before it has overshot the control temperature level. As the rapid increase of temperature is checked, bellows 143 with the insulated bulb has sufficient time to reach its balanced steady state force and return assembly 138 (or 38) and, for example, thereby return fan clutch excitation to its proper steady state condition.

If a sudden drop in temperature appears in the system, the two primary control bellows (such as 141 and 142) collapse rapidly, opening the resistance shunting contacts (and, for example, reducing the fan excitation and speed), and they are assisted in this action by the thermal storage bulb of bellows 143 which remains warmer than the surrounding fluid, thereby preventing further undesirable temperature drop in the controlled medium.

My invention is not limited to the use of beam lever means or to the use of bulb operated bellows means for producing the various forces but obviously includes various variations such as where one or more of the forces or torque is provided by a temperature responsive bi-metal helix operating on a shaft.

Also shown in the device as illustrated in Figs. 2 and 3 is a cylindrical shaped capacitor 158 and a rectangular shaped capacitor 159. For the purpose of simplifying the illustration the actual wiring is not shown in Figs. 2–5, but those skilled in the art will recognize the capacitor 158 is of conventional type such as may be found useful for suppressing arcs across resistance shorting commutating fingers 102—121 and capacitor 159 is of conventional type such as may be found useful for suppressing arcs across the set of contacts 101 and 152 used to operate the shutter control.

As shown in Figs. 2 and 4, a stud 160 is used to provide adjustment of upper and lower limits provided by spaced washers 161 and 162, respectively, between which an extension 138a of pivotal assembly 138 operates.

There is thus provided a device of the character described capable of meeting the objects hereinabove set forth. The provision of two main operating bellows reduces the need for travel by one-half and provides a desirable safety factor in that if one bellows should leak, it provides a fixed pivot point and the other can accomplish the entire control by itself by merely going through twice the customary travel. In the specific embodiment of Fig. 1, the bias of the coil springs tends to stop the fan and the main operating bellows tend to start the fan when their associated bulbs become heated to a predetermined temperature. While it may be desirable to have the adjustment made in a large plurality of steps, such as the twenty-one steps shown in Figs. 2–5, it must be remembered that if each contact finger exerts one ounce pressure on the operating arm the total finger pressure on the operating arm for the different positions of travel varies from zero ounces to twenty-one ounces. However, with the spring biasing arrangement described in connection with Figs. 2–5, that is with each spring arranged substantially at right angles to the pivotal member, with opposite ends of the springs arranged transversely of the pivot, the spring lever arms may be readily arranged to be constantly changing to compensate for this change of finger pressure as well as for changing spring action of the bellows themselves. The slide 154 operating on a fixed slide plate and adjusted (as by the stud 156) allows recalibration by changing the point which is fixed and to which the springs are attached. Oscillation and hunting is meanwhile prevented by the insulated bulb bellows acting as a damper on the system and the relay is particularly advantageous in that it meets the problem of stability at low ambients and with low heat rejection rates (as from an engine) although with a simple and inexpensive construction.

My invention is not to be considered limited to a case where rotatable lever means are used, but obviously includes other translating means such as a back and forth linearly movable translating member.

While I have illustrated and described particular embodiments of my invention, it will be apparent to those skilled in the art that numerous changes and modifications may be made without departing from the true spirit and scope of my invention. I intend, therefore, in the appended claims to cover all changes and modifications falling within the true spirit and scope of my invention.

What I claim as new and desire to secure by Letters Patent of the United States is:

1. A control device for maintaining a temperature condition relatively constant, said device comprising lever means movable about a fulcrum, an equalizer bar pivotally connected to said lever means at one side of said fulcrum, a pair of temperature sensing bulb and bellows arrangements adapted with an increase in said temperature condition to apply force to said equalizer bar at a pair of laterally spaced points for moving said lever means, the point of pivotal connection of said equalizer bar to said lever means being substantially midway between said laterally spaced points, and an insulated temperature bulb and bellows arrangement adapted to operate on said lever means in opposition to said pair of bulb and bellows arrangements, said insulation acting to provide a time delay in the operation of said third bulb and bellows arrangement whereby the operation of said device is stabilized.

2. An electric circuit controlling device for maintaining a temperature condition relatively constant, said device comprising lever means movable about a fulcrum between two stop positions, a resistor having a plurality of sections, a plurality of resiliently mounted contact members, an operating bar associated with said lever means and disposed to sequentially operate said contact members to shunt said resistor sections step by step with movement of said lever means in a first direction, an expansible bellows having an insulated bulb arranged to be substantially immediately responsive to said temperature condition for actuating said lever means in one of said two directions, and an expansible bellows having a bulb and associated thermal storage means and arranged to be responsive to said temperature condition after a predetermined time delay caused by said thermal storage means, with said second mentioned expansible bellows arranged to move said lever means in the other of said two directions, oppose the action of said first mentioned bellows and provide stabilization in the operation of said electric circuit controlling device.

3. In an electric circuit controlling relay mounted on a conduit member and adapted to regulate the temperature of a fluid therein by controlling the electrical energization of temperature adjusting apparatus, the combination of lever means movable about a pivot between a first and second stop position, a plurality of circuit making and breaking means arranged to operate responsive to movement of said lever means for incrementally energizing said temperature adjusting apparatus with movement of said lever means toward said first stop position and for incrementally de-energizing said temperature adjusting apparatus with movement of said lever means toward said second stop position, primary control means comprising at least one expansible bellows having a substantially un-insulated bulb arranged in said conduit member to be responsive to the temperature of fluid therein with said bellows mechanically connected to operate said lever means toward one of said positions with an increase in temperature, stabilizing means comprising at least one expansible bellows having a substantially insulated bulb arranged in said conduit member to be mediately responsive to the temperature of fluid therein with said second mentioned bellows mechanically connected to operate said lever means in a direction to oppose in part the action of said first mentioned bellows for example with said increase in temperature, and spring means connected to said lever means to oppose in part the action of said first mentioned bellows, said spring means comprising at least one spring member having a first end tied to an extension of said lever means transversely of said pivot and an opposite end secured to a manually adjustable fixed member transversely of said pivot whereby said spring means is adapted to change its point of force application with respect to said pivot with movement of said lever means to compensate for bellows spring rate and for changing spring force exerted on said lever means by said circuit making and braking means.

4. In a relay adapted to be mounted on a pipe to regulate the temperature of a fluid therein, a pair of control bellows each having a bulb adapted to be substantially immersed in and contacted by said fluid, a lever mechanism arranged to be operated in a first relative direction by expansion of both of said control bellows, adjustable spring means biasing said lever mechanism in the opposite direction, an additional bellows having an insulated bulb adapted to be immersed in while partially insulated from said fluid, said additional bellows being arranged to exert a force on said lever mechanism opposite to the force exerted by said pair of control bellows for the same direction of temperature change and resultant bellows movement, and an equalizer interposed between said control bellows and said lever means and pivotally connected to said lever means substantially midway between points of force application on said equalizer bar from said two control bellows, whereby either of said control bellows may operate said relay by itself at substantially the same control temperatures at which both of said bellows would operate and any one of said three bellows may fail without the relay being rendered inoperative to affect principal control.

5. A temperature control device comprising a rigid piece turnable in a first and second direction about an axis, a resistor having a plurality of sections, a plurality of contact means, means for sequentially closing said contact means to shunt said resistor sections step-by-step responsive to movement of said rigid piece in said first direction, first temperature change responsive control means operatively connected to move said rigid piece in said first direction responsive to temperature change of a given sense, and stabilizing means comprising second temperature change responsive means having associated therewith thermal storage means and connected to move said rigid piece in said second direction responsive to temperature change of the same sense after a time delay.

6. A temperature control device comprising translating means movable in a first and second direction, a resistor having a plurality of sections, a plurality of contact means, means for sequentially closing said contact means to shunt said resistor section step-by-step responsive to movement of said translating means in said first direction, primary actuating means comprising a gas-filled bulb and interconnected bellows arranged to operate said translating means in said first direction, and stabilizing means comprising a gas-filled insulated bulb and an interconnected bellows arranged to operate said translating means in said second direction.

7. A control device for maintaining a temperature condition relatively constant, said device comprising lever means movable about a fulcrum, an equalizer bar pivotally connected to said lever means at one side of said fulcrum, a pair of temperature sensing bulb-and-bellows arrangements adapted with an increase in said temperature condition to apply force to said equalizer bar at a pair of laterally spaced points for moving said lever means, the point of pivotal connection to said equalizer bar to said lever means being substantially midway between said laterally spaced points, an insulated temperature bulb and bellows arrangement adapted to operate on said lever means in opposition to said pair of bulb and bellows arrangements, the insulation of said last-named bulb and bellows arrangement acting to provide a time delay in the operation thereof whereby the operation of said device is stabilized, and spring means connected to said lever means to oppose in part the action of said pair of bulb and bellows arrangements.

8. A control device for maintaining a temperature condition relatively constant, said device comprising lever means movable about a fulcrum, an equalizer bar pivotally connected to said lever means at one side of said fulcrum, a pair of temperature sensing bulb and bellows arrangements adapted with an increase in said temperature condition to apply force to said equalizer bar at a pair of laterally spaced points for moving said lever means, the point of pivotal connection of said equalizer bar to said lever means being substantially midway between said laterally spaced points, an insulated temperature bulb and bellows arrangement adapted to operate on said lever means in opposition to said pair of bulb and bellows arrangements, the insulation of said last-named bulb and bellows arrangement acting to provide a time delay in the application thereof whereby the operation of said device is stabilized, spring means connected to said lever means to oppose in part the action of said pair of bulb and bellows arrangements, and means for changing the point of force application of said spring with respect to said fulcrum responsive to movement of said lever means to compensate for the spring rate of said bellows.

9. A control device for maintaining a temperature condition relatively constant, said device comprising lever means movable about a fulcrum in a first and second direction, a resistor having a plurality of sections, a plurality of contact means, means for sequentially closing said contact means to shunt said resistor sections step-by-step responsive to movement of said lever means in said first direction, a temperature sensing bulb and bellows arrangement adapted with an increase in said temperature condition to apply force to said lever means for moving said lever means in said first direction, an insulated temperature bulb and bellows arrangement adapted to operate on said lever means in opposition to said first-mentioned bulb and bellows arrangement, the insulation of said last-named bulb and bellows arrangement acting to provide a time delay in the operation thereof whereby the operation of said device is stabilized, spring means connected to said lever means to oppose in part the action of said first-mentioned bulb and bellows arrangement, and means for changing the point of force application of said spring with respect to said fulcrum responsive to movement of said lever means to compensate for bellows spring rate and for changing spring force exerted on said lever means by said contact means.

EARNEST F. WEISER.

REFERENCES CITED

The following references are of record in the file of this patent:

UNITED STATES PATENTS

| Number | Name | Date |
| --- | --- | --- |
| 961,654 | Sheer | June 14, 1910 |
| 1,698,031 | Smoot | Jan. 8, 1929 |
| 2,115,431 | Shively | Apr. 26, 1938 |
| 2,355,975 | Henrici | Aug. 15, 1944 |